July 24, 1962

T. J. BLOCHER, JR 3,046,470

TRANSISTOR CONTROL CIRCUITS

Filed Sept. 9, 1958

INVENTOR.
Thomas J. Blocher Jr.

BY W. L. Stout

HIS ATTORNEY 3,046,470
TRANSISTOR CONTROL CIRCUITS
Thomas J. Blocher, Jr., Monroeville, Pa., assignor to Westinghouse Air Brake Company, Wilmerding, Pa., a corporation of Pennsylvania
Filed Sept. 9, 1958, Ser. No. 759,984
4 Claims. (Cl. 323—22)

This invention relates to transistor control circuits, and more particularly to a transistor circuit for providing a controlled application of current to a load.

It has been found that in certain instances immediate application of full voltage to a load such as a magnetic clutch results, after repeated use, in physical damage to said clutch.

Accordingly, it is a principal object of this invention to provide a novel circuit for gradually applying current to a load.

It is another object of this invention to provide a small, compact and lightweight circuit for providing a relatively slow or long rise time for a current applied to a load.

In the attainment of the foregoing objects I provide a circuit including a pair of transistors, a capacitor, and biasing and current limiting resistors. The path for the current flowing through the load is through the first of said transistors. The impedance presented by said first transistor to said load current is controlled by the second transistor. Said capacitor in turn controls the biasing voltage impressed across said second transistor.

Figure 1:
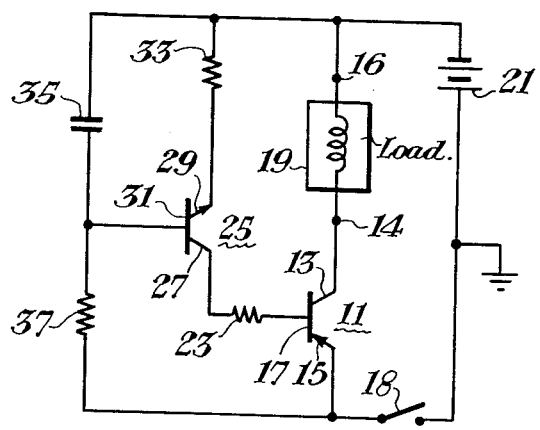
Figure 2:
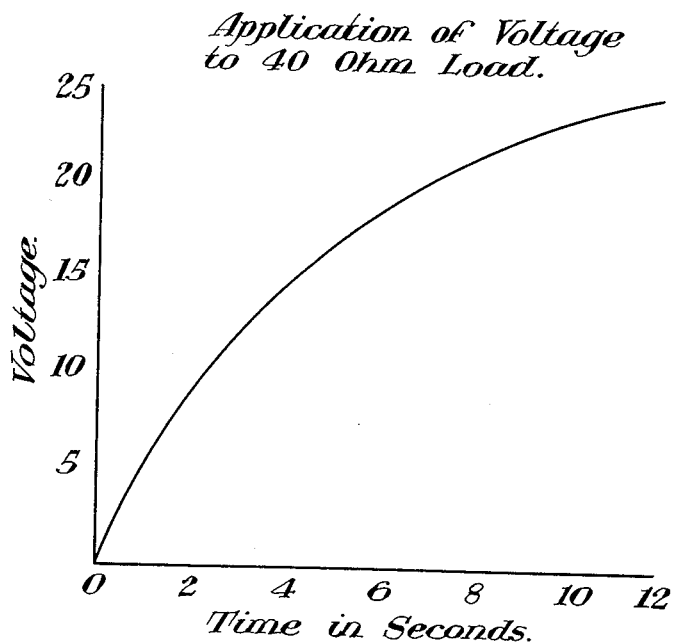

Other objects and advantages of my invention will become apparent from the following description and the accompanying drawings in which:

FIG. 1 is a schematic diagram of the control circuit in accordance with my invention; and FIG. 2 is a voltage versus time curve showing the gradually increasing voltage applied to the load.

I shall first describe my control circuit and shall then point out the novel features thereof in the appended claims.

Referring to FIG. 1 in detail, a first transistor 11 which is of the P-N-P type has its collector electrode 13 connected to one terminal 14 of a load 19, here shown as the winding of a magnetic clutch. The other terminal 16 of load 19 is connected to the negative pole of a direct current source 21. The positive pole of source 21 is connected to ground reference. Load 19 may be a magnetic clutch as discussed above or any type of load for which gradual application of energization current is desired. The emitter electrode 15 of transistor 11 is connected to one terminal of an on-off switch 18, the other terminal of which is connected to ground reference. The base 17 of transistor 11 is connected through a resistance 23 to the collector electrode 27 of a second transistor 25 which is of the N-P-N type. The emitter electrode 29 of transistor 25 is connected through an impedance indicated as a resistor 33 to the negative pole of source 21. The base electrode 31 of transistor 25 is connected to the common junction of a capacitor or condenser 35 and an impedance indicated as a resistor 37. The other or upper terminal of capacitor 35 is connected to the negative pole of source 21, and the other or lower terminal of resistance 37 is connected to the emitter 15 of transistor 11.

The following table shows the values of the circuit components as used in one satisfactory test. These values are set forth only as a specific example, and the invention is of course not intended to be limited to the particular values given.

| | |
|---|---|
| Transistor 11 | 2N277. |
| Transistor 25 | 2N388. |
| Resistor 23 | 1.0K ohms. |
| Resistor 33 | 2.2K ohms. |
| Resistor 37 | 100K ohms. |
| Capacitor 35 | 100 microfarads. |
| Battery 21 | 28 V.D.C. |
| Load 19 | 0.7 amp, 40 ohms. |

The mode of operation of my above-described circuit is substantially as follows: At the instant the switch 18 is closed the only current flowing in the load 19 is the leakage collector current which flows in the transistor at cut-off, normally designated at $I_{co}$. Immediately after switch 18 closes, the capacitor 35 will start to charge through resistor 37 to a more positive potential at its lower terminal. As the potential difference between emitter 29 and base 31 of transistor 25 changes, the current flowing through collector 27 of transistor 25 increases proportionally. As will be appreciated the current to collector 27 flows from the base 17 of transistor 11. Consequently, an increase in the current flowing in the base 17 causes a proportionally larger current to flow in the collector 13 of transistor 11. The currents through the base 17 and collector 13 of transistor 11 will continue to increase until transistor 11 saturates. The current flowing through transistor 25 will also continue to increase until transistor 25 also saturates. Saturation of transistor 11 effectively places almost all of the supply voltage of source 21 across the load.

Resistors 23 and 33 limit the current flowing through the base 17 of transistor 11 to a safe value. Resistor 23 also lowers the power dissipation of transistor 25.

With a circuit according to my invention and having the specific values as shown in the above table, a voltage versus time curve as shown in FIG. 2 was obtained. The rise time of 63% applied voltage was approximately that of the conventional RC time constant, provided R is assumed to be the parallel resistance of resistor 37 and the equivalent resistance of resistor 33. The equivalent resistance of resistor 33 is here taken as the value of resistor 33 multiplied by the current amplification factor, ~100, of transistor 25. Consequently, my circuit provides a considerably longer or slower rise time than a conventional RC network. Thus it will be appreciated that a principal advantage of my above described circuit is that it provides a means of obtaining a long time constant at high current with a relatively uncomplicated circuit using a minimum of small components. Further, capacitor 35 discharges rapidly through a circuit traced from the lower terminal of the capacitor, base 31 to collector 29 of transistor 25, and resistor 33 to the upper terminal of the capacitor, and thus recovers very quickly to protect the load. The discharge time constant is equal to the capacitance of capacitor 35 multiplied by the resistance of resistor 33.

I have illustrated the principles of my invention by describing a circuit in which transistor 11 is of the P-N-P type and transistor 25 of the N-P-N type. However, the types of both transistors may be interchanged provided the polarity of direct current source 21 is reversed.

While my invention has been described with reference to a particular embodiment thereof, it will be understood that various modifications may be made by those skilled in the art without departing from the invention. The appended claims are therefore intended to cover all such modifications within the true spirit and scope of the invention.

Having thus described my invention, what I claim is:

1. For use with switch means, a control circuit for applying current from a direct current source to a load connected across the source through the switch means comprising, a first and a second transistor of different conductivity types, each transistor including an emitter, a base and a collector, said first transistor having its collector and emitter interconnected through the load, the source and the switch means, said second transistor having its collector connected to the base of said first transistor and its emitter connected to the source, a capacitor and a resistor connected in series with respect to one another and across the source, said load and the emitter to collector path of said first transistor connected in parallel with said capacitor and resistor, and the base of said second transistor being connected to the junction of said capacitor and said resistor whereby when the switch means is closed a gradually increasing current is initially supplied until substantially the full supply voltage is applied to said load.

2. For use with switch means, a control circuit for applying current from a direct current source to a load connected across the source through the switch means comprising, a first and second transistor of different conductivity types, each transistor including an emitter, a base and a collector, said first transistor having its collector and emitter interconnected through the load, the source and the switch means, a first resistor, said second transistor having its collector connected to the base of said first transistor and its emitter connected through said first resistor to the source, a capacitor and a second resistor connected in series with respect to one another and cross the source, said load and the emitter to collector path of said first transistor connected in parallel with said capacitor and resistor, and the base of said second transistor being connected to the junction of said capacitor and said resistor whereby when the switch means is closed an initial current is obtained having a time constant given by:

$$\left[\left(\frac{R_{equiv.} \times R_{second\ resistor}}{R_{equiv.} + R_{second\ resistor}}\right) C_{capacitor}\right]$$

where $R_{equiv.} = (R_{first\ resistor})$ (current amplification factor of said second transistor).

3. For use with switch means a control circuit for providing a gradual application of current from a direct current source to a load connected across the source through said switch means comprising, first and second transistors, said transistors being of different semi-conductive types and each including an emitter, a base and a collector, said switch means when closed connecting the emitter of said first transistor to said source, the collector of said first transistor being connected to one terminal of said load, the other terminal of said load being connected to said source, a first impedance, the base of said first transistor being connected through said first impedance to the collector of said second transistor, a second impedance, the emitter of said second transistor being connected through said second impedance to said source, a capacitor and a resistor connected in series with respect to one another and across the terminals of said source, said load and the emitter to collector path of said first transistor being connected in parallel with said capacitor and said resistor, and the base of said second transistor being connected to the junction of said capacitor and said resistor whereby upon actuating said switch means a gradually increasing current is initially supplied until substantially the full supply voltage is applied to said load.

4. A control circuit for providing a gradual application of current from a direct current source to a load connected thereto comprising, switch means, a first and a second transistor including emitter, base and collector electrodes, said first transistor being of the P-N-P type, the second transistor being of the N-P-N type, the collector and the emitter of said first transistor being interconnected through said direct current source and said switch, said second transistor having its collector connected to the base of said first transistor, said second transistor having its emitter connected to said source, a capacitor and a resistor connected in series with each other and across the terminals of said source, said load and the emitter to collector path of said first transistor being connected in parallel with said capacitor and said resistor, the base of said second transistor being connected to the junction of said capacitor and said resistor, current flow from the collector to emitter of said second transistor being determined by the instantaneous potential across said capacitor, and current flow from the emitter to collector of said first transistor being determined by current flowing from the emitter to the base of said first transistor and through the collector to the emitter of said second transistor whereby a gradually increasing current is initially supplied until substantially the full supply voltage is applied to said load.

References Cited in the file of this patent

UNITED STATES PATENTS

| | | |
|---|---|---|
| 2,751,549 | Chase | June 19, 1956 |
| 2,780,752 | Aldrich et al. | Feb. 5, 1957 |
| 2,788,449 | Bright | Apr. 9, 1957 |
| 2,906,926 | Bauer | Sept. 29, 1959 |